United States Patent [19]
Phillips

[11] Patent Number: 6,118,765
[45] Date of Patent: Sep. 12, 2000

[54] SYSTEM METHOD AND COMPUTER PROGRAM PRODUCT FOR ELIMINATING UNNECESSARY RETRANSMISSIONS

[75] Inventor: Marc S. Phillips, San Diego, Calif.

[73] Assignee: Qualcomm Inc., San Diego, Calif.

[21] Appl. No.: 09/006,685

[22] Filed: Jan. 13, 1998

[51] Int. Cl.[7] .................................................. G06F 11/00
[52] U.S. Cl. .......................... 370/235; 370/252; 370/401; 370/428
[58] Field of Search ..................................... 370/394, 389, 370/229, 230, 231, 235, 236, 252, 401, 428, 522; 714/749, 747, 748

[56] References Cited

U.S. PATENT DOCUMENTS

| | | | |
|---|---|---|---|
| 5,442,637 | 8/1995 | Nguyen | 714/708 |
| 5,444,718 | 8/1995 | Ejzak et al. | 714/748 |
| 5,793,768 | 8/1998 | Keshav | 370/400 |
| 6,018,516 | 1/2000 | Packer | 370/231 |
| 6,031,818 | 2/2000 | Lo et al. | 370/216 |

OTHER PUBLICATIONS

"Auxiliary Timeout and Selective Packet Discard Schemes to Improve TCP Performance in PCN Environment" Byung–Gon Chun et al; IEEE 1997, pp. 381–385.

R. Braden, "Requirements for Internet Hosts—Communication Layers", Oct. 1989, pp. 1–108.

*Primary Examiner*—Douglas W. Olms
*Assistant Examiner*—Seema S. Rao
*Attorney, Agent, or Firm*—Philip Wadsworth; Thomas R. Rouse; Kent D. Baker

[57] ABSTRACT

A system, method and computer program product for preventing unnecessary retransmissions from being sent from a terminal such as, for example, an internet host computer, on a slow link. A slow link TCP optimizer receives data packets from a host computer and determines, based on an estimated round trip time, whether a data packet is a new data packet, a valid retransmitted data packet or an unnecessary retransmitted data packet. New data packets and valid retransmitted data packets are forwarded over the slow link to a remote terminal. Unnecessary retransmitted data packets are discarded. The estimating a round trip time is determined as the time it takes for a data packet to travel from the present invention to the remote terminal and for an acknowledgment of receipt to travel from the remote terminal back to the present invention. The estimated round trip time includes throughput latency that results from a slow link. The slow link TCP optimizer does not affect data packets that are sent from a host computer that properly accounts for a slow link when determining a round trip time.

19 Claims, 13 Drawing Sheets

SLOW LINK TCP OPTIMIZER

SLOW LINK TCP OPTIMIZER

STEP 824

| TIME | SEQ_NUM | END_OF_PKT | EXPECTED_SEQ_NUM | HIGHEST_SEQ_NUM |
|---|---|---|---|---|
| T0 | NA | 1 | 1 | 1 |
| T1 | 1 | 1→2 | 1→2 | 1→2 |
| T2 | 2 | 2→3 | 2→3 | 2→3 |
| T3 | 3 | 3→4 | 3→4 | 3→4 |
| T4 | 2 | 4→3 | 4 | 4 |
| T5 | 4 | 3→5 | 4→5 | 4→5 |

FIG. 10

| TIME | SEQ_NUM | END_OF_PKT | EXPECTED_SEQ_NUM | HIGHEST_SEQ_NUM |
|---|---|---|---|---|
| T0 | NA | 1 | 1 | 1 |
| T1 | 1 | 1→2 | 1→2 | 1→2 |
| T2 | 3 | 3→4 | 2 | 2→4 |
| T3 | 2 | 4→3 | 2→3 | 4 |
| T4 | 4 | 4→5 | 3 | 4→5 |
| T5 | 5 | 5→6 | 3 | 5→6 |
| T6 | NA | NA | 3→6 | 6 |

SYSTEM METHOD AND COMPUTER PROGRAM PRODUCT FOR ELIMINATING UNNECESSARY RETRANSMISSIONS

BACKGROUND OF THE INVENTION

1. Field of the Invention

The present invention is related to elimination of unnecessary data retransmissions. More particularly, the present invention is related to preventing unnecessary retransmissions from being sent from a terminal, such as an internet host computer, on a slow link.

2. Related Art

Data communications systems typically employ a send and acknowledge scheme, whereby a first terminal sends data packets to a second terminal and the second terminal responds with acknowledge signals. Generally, if the first terminal does not receive an acknowledge signal within a prescribed period of time, the first terminal retransmits the data packet under the assumption that the initial transmission was not received by the second terminal.

The prescribed period of time is often based on an expected round trip time it takes for the data packet to travel to the second terminal and for the corresponding acknowledge signal to return to the first terminal. Round trip times are typically estimated by sending a sample data packet and measuring the time it takes to receive an acknowledge.

Some communication links include what are referred to herein as "slow links." Slow links are communication links that add some amount of latency to the round trip time, wherein the latency depends upon the amount of data being sent. Small sample data packets are often unaffected by latency of slow links. Estimates of round trip times that rely only on small data packet round trip times thus underestimate actual round trip times. As a result, round trip times expire prematurely, causing unnecessary retransmissions of data. Unnecessary retransmissions clog communication links and cause other problems as well. In many situations, the user of the second terminal has no control over the first terminal and thus has no ability to require or ensure that the first terminal correctly estimates round trip time.

Unnecessary data retransmissions are a problem for many types of data communications. In order to more fully understand the cause, effects and solution to unnecessary data retransmissions, data retransmissions are described below within the context of an internet communication system. The examples below are provided to illustrate the problem and solution of unnecessary data retransmissions. They are not intended to limit the scope of the present invention.

An internet communication system includes interconnected networks that support communication among host computers using internet protocols. A host computer typically executes application programs on behalf of users, employing network and/or internet communication services in support of this function. Internet host computers can span a wide range of sizes, speed and functions and can range in size from small microprocessors through workstations to mainframes and super computers. In function, they range from single-purpose hosts (such as terminal servers) to full-service hosts that support a variety of online network services, typically including remote login, file transfer and electronic mail.

The internet is thus a network of networks where each host is directly connected to some particular network or networks. A connection between a host and the internet is only conceptual. Two hosts on the same network communicate with each other using the same setup protocols that they would use to communicate with hosts on distant networks.

Individual or remote users can access the internet from remote terminals (e.g., personal computers, laptop computers, etc.) via internet service providers (ISP). An ISP can also serve as an internet host computer. Remote users are typically connected to ISPs through a public service telecommunications network (PSTN). A coupling between a remote user and a PSTN is typically a slow link such as a PSTN cellular link or a code division multiple access (CDMA) cellular link, which can limit transmission to nominal rates such as, for example, 1200 bits per second (bps), 2400 bps, 4800 bps, 9600 bps, 14,400 bps, etc. These systems are referred to as slow links because communications through these slow links tend to be slower than communications between hosts and between hosts and ISPs on the internet.

When a host computer sends a stream of data packets through an ISP to a remote terminal, the slow link between the ISP and the remote terminal creates a bottleneck where data packets from the host congregate while waiting to be sent to the remote terminal over the slow link. As a result, slow links limit data throughput.

A basic objective of internet design is to tolerate a wide range of network characteristics such as, for example, bandwidth, delay, packet loss, packet reordering and maximum packet size. Accordingly, an internet engineering task force has generated communication specifications for internet host computers. Some of these specifications are available as Request For Comments (RFCs), that are available on the internet at, for example, http://www.nexor.com/ public/ rfc/rfcs/rfc. Of particular interest here is an RFC 1122, available on the internet at http://www.nexor.com/public/rfc/ rfcs/rfc1122.txt, incorporated herein in its entirety by reference.

These RFCs provide specifications for, among other things, a transmission control protocol (TCP) used by internet host computers. TCP is the primary protocol for the internet. TCP provides reliable, in-sequence delivery of a full-duplex stream of octets (8-bit bytes). TCP is used by applications that require reliable, connection-oriented transport service, e.g., mail (SMTP), file transfer (FTP), and virtual terminal service (Telnet).

Host computers typically maintain a sliding window within which they transmit data packets. Under RFC 1122, in order to prevent bottlenecks, host computers wait for an acknowledgment from a remote terminal when a data packet is sent. Host computers use the acknowledge signals to slide the window and transmit more data.

Host computers typically set a round trip timer based on an estimated round trip time that it takes for a data packet to travel to a remote user and for an acknowledgment from the remote user to travel back to the host computer. When a host computer sends a data packet, the round trip timer is set. If an acknowledgment is not received by the expiration of the round trip timer, the data packet is resent on the assumption that the data packet was not received by the remote terminal. According to RFC 1122, section 4.2.2.15, titled "Retransmission Timeout: RFC-793 section 3.7", > Recent Work by Jacobson [TCP:7] on Internet Congestion and TCP Retransmission Stability has produced a transmission algorithm combining "slow start" with "congestion avoidance". A TCP MUST implement this algorithm.

For purposes of the present invention, it is assumed that, when a host computer implements a retransmission timeout algorithm as required by RFC 1122, transmissions from internet host computers to remote users are optimized. In other words, it is assumed that where a host computer follows the requirements of RFC 1122, round trip times are properly estimated.

However, it has been determined that at least some internet host computers (hereinafter "non-compliant host computers" or "non-compliant hosts") do not employ, or do not properly employ, algorithms for optimizing data retransmissions. More specifically, it is believed that non-compliant host computers do not take slow links into account when setting round trip timers.

A host computer should calculate round trip time based on the sum of the actual round trip time of a small (e.g., 1 byte) data packet and based on any slow link latency in the system. Small data packets are typically not affected by slow links because their small size permits them to be sent over the slow link in a single send operation and because they are typically the first data sent to a slow link. Being the first data sent to a slow link means there is no existing bottle neck at the slow link which might otherwise slow transmission of the test data.

Based on examination of actual transmitted data packets, it appears that non-compliant host computers set their round trip timers based only on the round trip time of a small (e.g., 1 byte) test packet. When a non-compliant host computer thereafter sends non-test data packets, which are typically much larger than 1 byte, the data packets get delayed at the slow link. Since the non-compliant host failed to take the slow link into account, the round trip timer expires before receipt of an acknowledgment signal from the remote terminal. The non-compliant host then retransmits the data packet under the assumption that the first data packet was not received by the remote terminal. Unnecessary retransmitted data packets lead to additional latency at the slow link.

In addition to increasing the delay at slow links, non-compliant hosts also mistakenly re-estimate round trip times based on acknowledgment data. When a non-compliant host sends a data packet, it also incorrectly sets its round trip timer. As a result of incorrectly setting its round trip timer, the round trip timer expires before receipt of an acknowledge from the remote terminal. When the round trip timer expires, the non-compliant host retransmits the data packet and resets the round trip timer.

When the first data packet is eventually received by the remote terminal, the remote terminal sends an acknowledge signal. Since the non-compliant host computer receives the acknowledge after retransmitting the data packet and after resetting the round trip timer, the non-compliant host mistakenly interprets the acknowledge as an acknowledgment of receipt of the retransmitted data packet rather than the initial data packet. The non-compliant host then re-estimates the round trip time as the time when it retransmitted the data packet to the time it received the acknowledge to the initial data packet. As a result, the non-compliant host expects to receive acknowledgment of subsequently transmitted data packets faster than before and, thus, retransmits subsequent data packets at a higher rate than before, further adding to the bottleneck at the slow link. It has been observed that unnecessary retransmissions from a non-compliant host computer can reduce the effective rate of data transmission from a nominal rate of 14.4 kbps to an actual data rate of 4–5 kbps or less.

One solution is to ensure that all internet host computers implement a compliant round trip timer scheme such as, for example, that specified in RFC 1122. However, no such mechanism or procedure currently exists.

What is needed is a system, method and computer program product for optimizing data transfers from host computers over slow links.

SUMMARY OF THE INVENTION

The present invention is a novel and improved system, method and computer program product for eliminating unnecessary retransmissions of data packets that are sent from, for example, an internet host computer. The present invention receives data packets from a host computer and determines, based on an estimated round trip time, whether a data packet is a new data packet, a valid retransmitted data packet or an unnecessary retransmitted data packet. New data packets and valid retransmitted data packets (i.e., out-of-order data packets), are forwarded to a remote terminal. Unnecessary retransmitted data packets are discarded.

The estimate of round trip time is determined as the time it takes for a data packet to travel to the remote terminal and for an acknowledgment of receipt to return from the remote terminal. The estimated round trip time includes throughput latency that results from a slow link.

In one embodiment, the present invention is implemented as a slow link TCP optimizer that includes a round trip timer, data tables that store information associated with the data packets including an expected sequence number, and a discriminator that employs the round trip timer to determine whether the data packets are valid data packets or unnecessary retransmitted data packets.

In one embodiment, the slow link TCP optimizer treats a data packet as a valid data packet if the round trip timer has expired. In addition, the slow link TCP optimizer determines that a data packet is a valid data packet when the round trip timer has not expired and the data packet has a sequence number that is not less than the expected sequence number. The slow link TCP optimizer also determines that a data packet is a valid data packet when the round trip timer has not expired, the data packet has a sequence number that is less than the expected sequence number and the data packet includes data that is not substantially similar to data in a previously received data packet. The slow link TCP optimizer determines that a data packet is an unnecessary retransmitted data packet when the round trip timer has not expired, the data packet has a sequence number that is less than the expected sequence number and the data packet includes data that is substantially similar to data in a previously received data packet.

In one embodiment, the data tables include a current sequence number, an end of packet number, a highest sequence number and an expected sequence number. When a data packet is a valid data packet, the slow link TCP optimizer updates the data tables as follows: the end of packet number is set to the sum of the TCP sequence number of the data packet and the IP length field of the data packet; the expected sequence number is set to the end of packet number when the sequence number is equal to the expected sequence number; the highest sequence number is set to the end of packet number when the end of packet number is greater than the highest sequence number; and the expected sequence number is set to the highest sequence number when the data packet has a sequence number that is less than the expected sequence number and the data packet includes data that is not substantially similar to data in a previously received data packet. Additionally, when a data packet is an unnecessary retransmitted data packet, the slow link TCP optimizer updates the data tables by setting the expected sequence number to the highest sequence number. Also, when a timer expires, the expected sequence number is set to be equal to the highest sequence number.

The present invention can be implemented in software, firmware, hardware or any combination thereof. The present invention is implemented between a slow link and a host computer. For example, the present invention can be implemented between a slow link and an internet service provider (ISP), within an ISP, between an ISP and a host, etc. The present invention can be employed by, for example, a telecommunications facility that provides communications between slow links (i.e., modems) and ISPs and by cellular telecommunications facilities that provide slow links between mobile telecommunication units and public service telephone networks (PSTNs).

One advantage of the present invention is that it eliminates unnecessary retransmissions that are sent from a host computer. Another advantage of the present invention is that it accommodates out-of-order data packets. Another advantage of the present invention is that it does not affect data packets that are sent from a host computer that properly accounts for a slow link when determining a round trip time.

Further features, objects, and advantages of the present invention will become more apparent from the detailed description set forth below.

BRIEF DESCRIPTION OF THE DRAWINGS

The features, objects, and advantages of the present invention will become more apparent from the detailed description set forth below when taken in conjunction with the drawings in which like reference characters identify correspondingly throughout. Additionally, the left-most digit of a reference number identifies the drawing in which the reference number first appears.

FIG. 10 is a data table that can be employed by the slow link TCP optimizer illustrated in FIG. 5;

DETAILED DESCRIPTION OF THE PREFERRED EMBODIMENTS

1. Overview of the Invention

Figure 1:
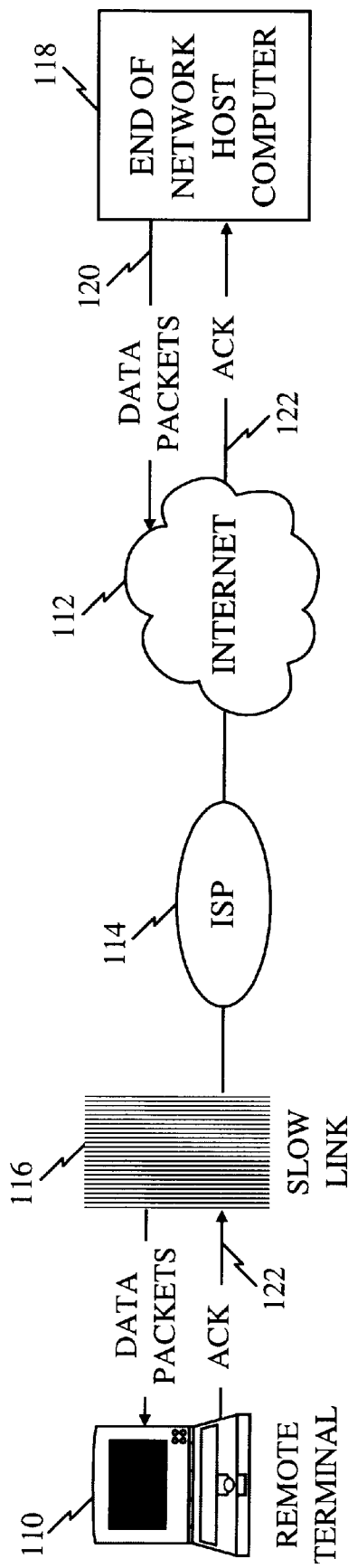
FIG. 1 is a block diagram of an interconnection between an internet host computer and a remote terminal through a slow link.

The present invention is a system, method and computer program product for preventing unnecessary retransmissions from being sent from a terminal such as, for example, an internet host computer, on a slow link.

The present invention receives data packets from a host computer and determines, based on an estimated round trip time, whether a data packet is a new data packet, a valid retransmitted data packet or an unnecessary retransmitted data packet. New data packets and valid retransmitted data packets are sent to the remote terminal. Unnecessary retransmitted data packets are discarded. The present invention also accommodates out-of-order data packets.

The present invention does not affect data packets that are sent from a compliant host computer that properly accounts for slow links. Thus, the present invention can be employed between a slow link and the internet without regard to whether a host computer properly accounts for a slow link. For example, the present invention can be employed by a telecommunications facility that provides communications between slow links (i.e., modems) and ISPs. The present invention can also be employed by a cellular telecommunications facility, such as a code division multiple access (CDMA) system, that provides a slow link connection between mobile telecommunication units and the Internet.

2. Example Environment

The present invention can be employed in any data communication system that retransmits data when an acknowledge signal is not received within a period of time. In one embodiment, the present invention is employed to prevent sending of unnecessary retransmissions from an internet host computer on a slow link. A system, method and computer program product for preventing unnecessary retransmissions from being sent from an internet host computer on a slow link, are now described. The examples herein are provided to assist in the description of the present invention, not to limit it.

To communicate using the internet system, a host computer can implement a layered set of protocols that is referred to in RFC 1122 as the internet protocol suite. A host computer typically implements at least one protocol from each layer. The protocol layers that are employed by the internet include an application layer, a transport layer, an internet layer and a link layer.

The application layer is the top layer of the internet protocol suite. The application layer includes user protocols that provide service directly to users and support protocols that provide common system functions. Typical internet user protocols include Telnet for remote login, File Transfer Protocol (FTP) for file transfers and SMTP for electronic mail delivery. There can also be a number of other standardized user protocols and private user protocols.

The transport layer provides end-to-end communication services for applications. Two primary transport layer protocols include Transmission Control Protocol (TCP) and User Datagram Protocol (UDP). TCP is a reliable connection-oriented transport service that provides end-to-end reliability, re-sequencing and flow control. UDP is a connection list ("datagram") transport service. Other transport protocols have been developed by internet research communities. Internet transport protocols can vary.

In the internet layer, all internet transport protocols use an internet protocol (IP) to carry data from source host to destination host. An IP datagram is the unit of end-to-end transmission in the IP protocol. An IP datagram includes an IP header followed by transport layer data, i.e., an IP header followed by a message. IP is a connection list or datagram internet work service, providing no end-to-end delivery guarantees. Thus, IP datagrams can arrive at the destination host damaged, duplicated, out-of-order or not at all. The layers above IP are responsible for reliable delivery service when it is required. The IP protocol includes provisions for addressing, type of service specification, fragmentation and reassembly, and security information. The internet layer can also employ an internet control message protocol (ICMP) and an IGN protocol (IGNP).

In the link layer, in order to communicate on its directly-connected network, a host computer can implement the communication protocol that is used to interface to that network. The link layer can be referred to as a media access layer. There is a wide variety of link layer, or media access layer, protocols, corresponding to the many different types of networks.

Referring to FIG. 1, a remote terminal 110 is connected to the internet 112 through a slow link 116 and an internet service provider (ISP) 114. Remote terminal 110 accesses an end of network host computer such as host computer 118 that is coupled to internet 112. End of network host computer 118 sends data packets 120 to remote terminal 110 through internet 112, ISP 114 and slow link 116. When remote terminal 110 receives a data packet 120, it sends an acknowledge 122 back to host computer 118. Within internet 112, the path taken by acknowledge signals 122 can be different than the path taken by data packets 120.

Figure 2:
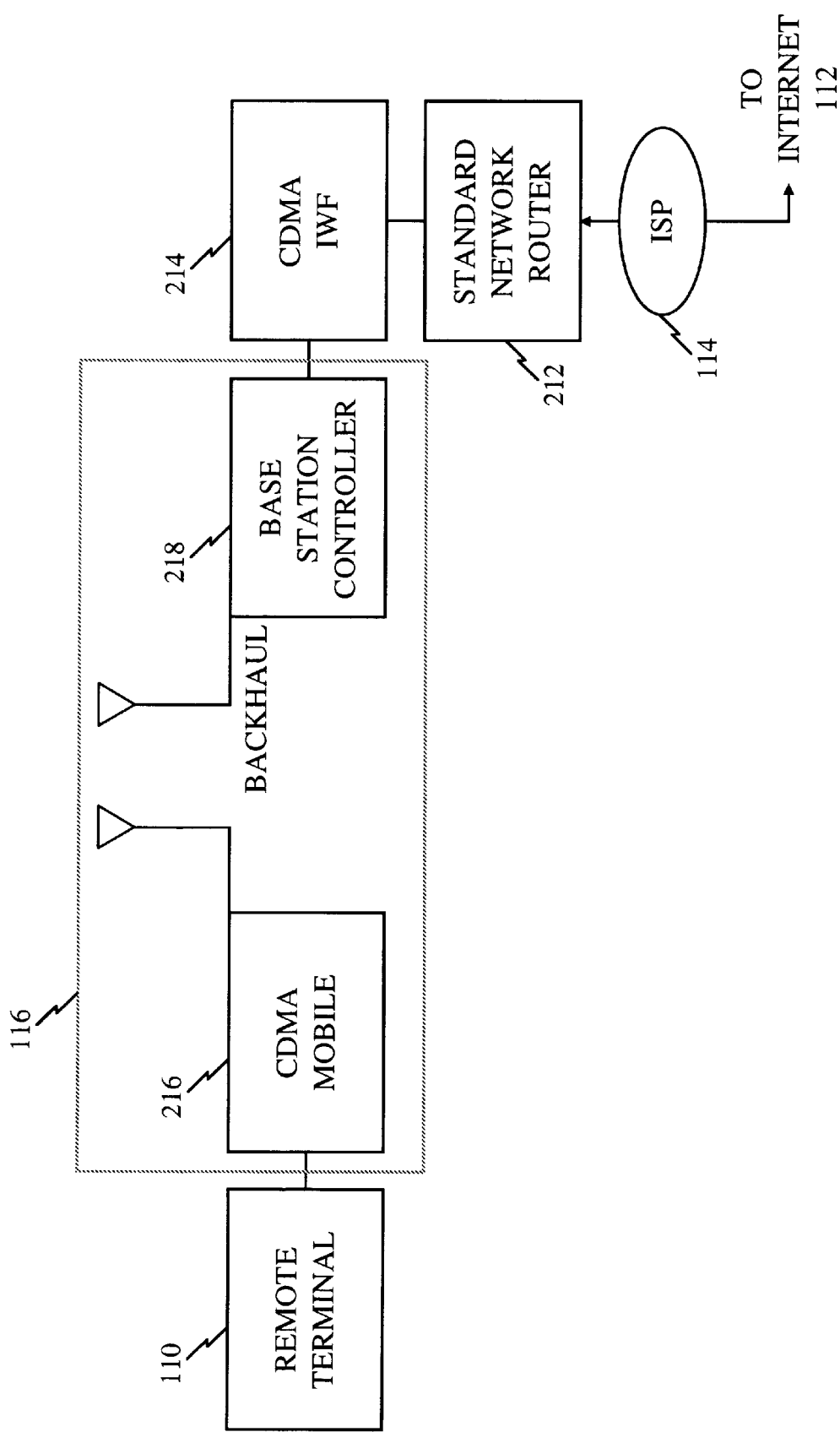
FIG. 2 is a code division multiple access (CDMA) cellular telecommunications example of the slow link illustrated in FIG. 1.

Referring to FIG. 2, slow link 116 is illustrated as a CDMA cellular telephone interconnection wherein ISP 114 sends data packets to a standard network router 212 which forwards the data packets to a CDMA inner working functions (IWF) module 214. IWP 214 acts as a router between a CDMA network and the internet. IWP 214 sees and understands every TCP IP header that comes through it. CDMA IWF 214 sends the data packets to a base station controller 218 for RF transmission to a CDMA mobile unit 216 which is coupled to remote terminal 110.

Figure 3:
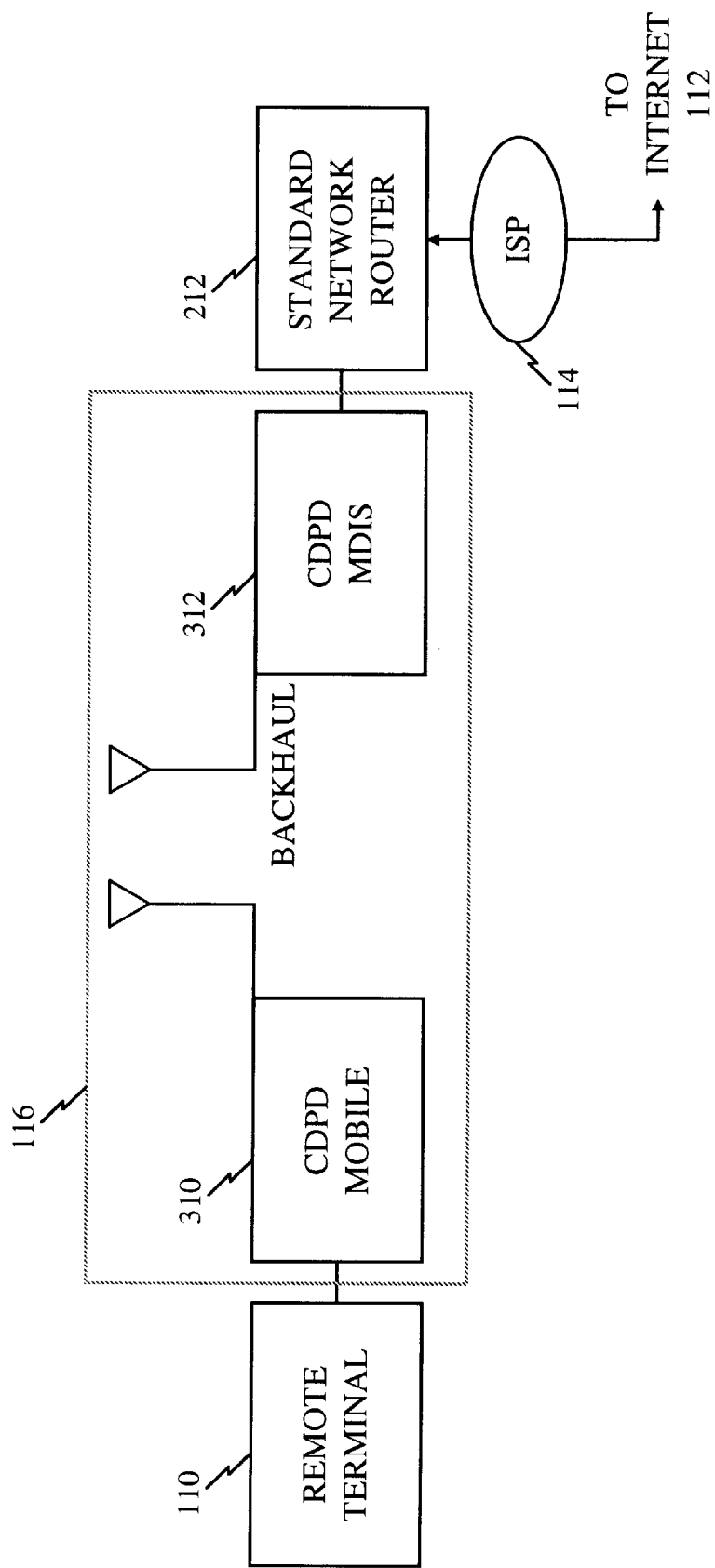
FIG. 3 is a block diagram of a CDPD cellular telecommunications example of the slow link illustrated in FIG. 1.

Referring to FIG. 3, slow link 116 is illustrated as a cellular digital packet data (CDPD) system including a CDPD mobile unit 310 and a CDPD mobile data intermediate system (MDIS) unit 312.

Figure 4:
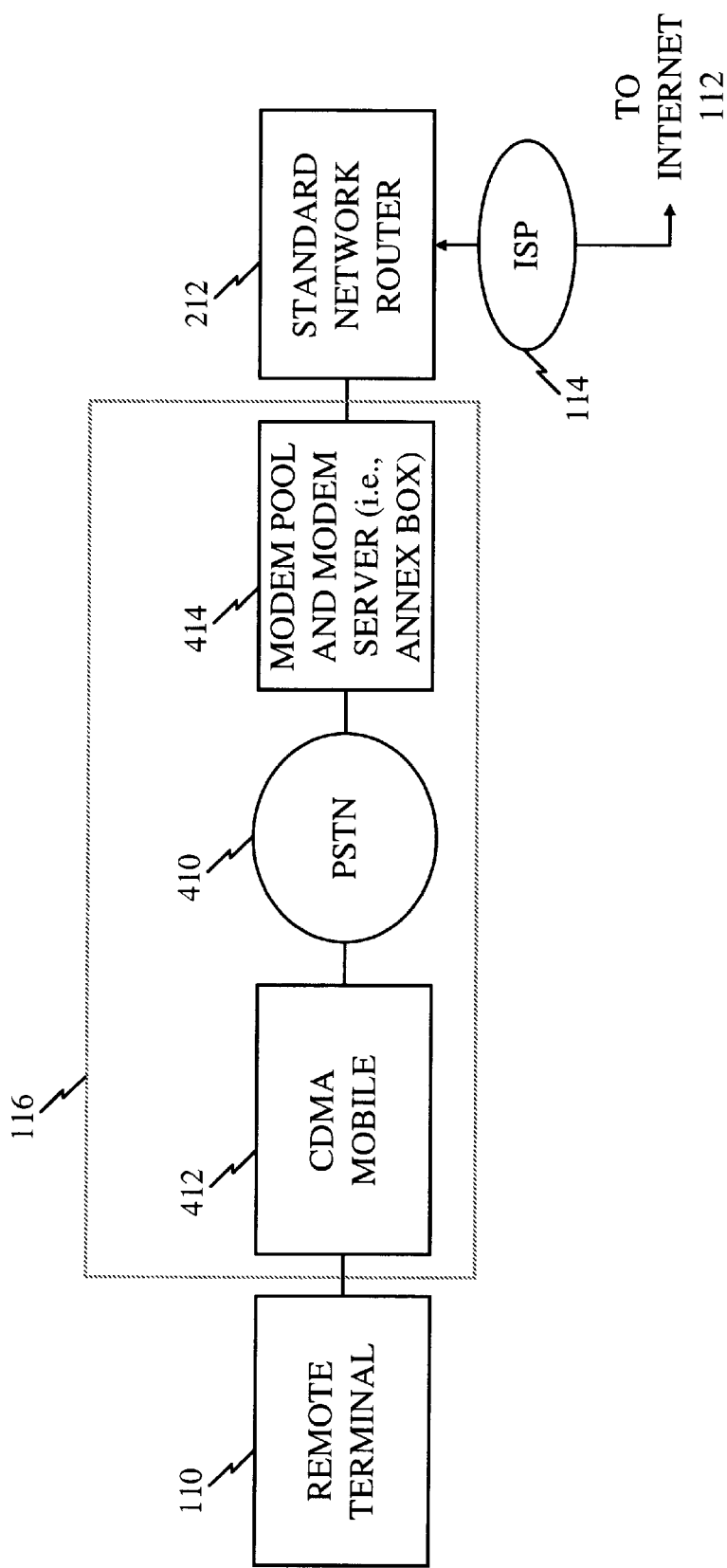
FIG. 4 is a land line modem/PSTN example of the slow link illustrated in FIG. 1.

Referring to FIG. 4, slow link 116 is illustrated as a land line modem/PSTN interconnection between remote terminal 110 and a standard network router 212. The land line modem/PSTN interconnection includes a land line modem 412 coupled to a PSTN 410 which is coupled to a standard network router 212 through a server 414.

In order to prevent excessive queuing of data packets 120 as shown in FIG. 1 at slow link 116, host computer 118 typically implements an acknowledge scheme that sends up to a given number of data packets, or a given amount of data, within a sliding window. When an acknowledgment of receipt of a data packet is received, the window slides so that another data packet can be sent.

Figure 12:
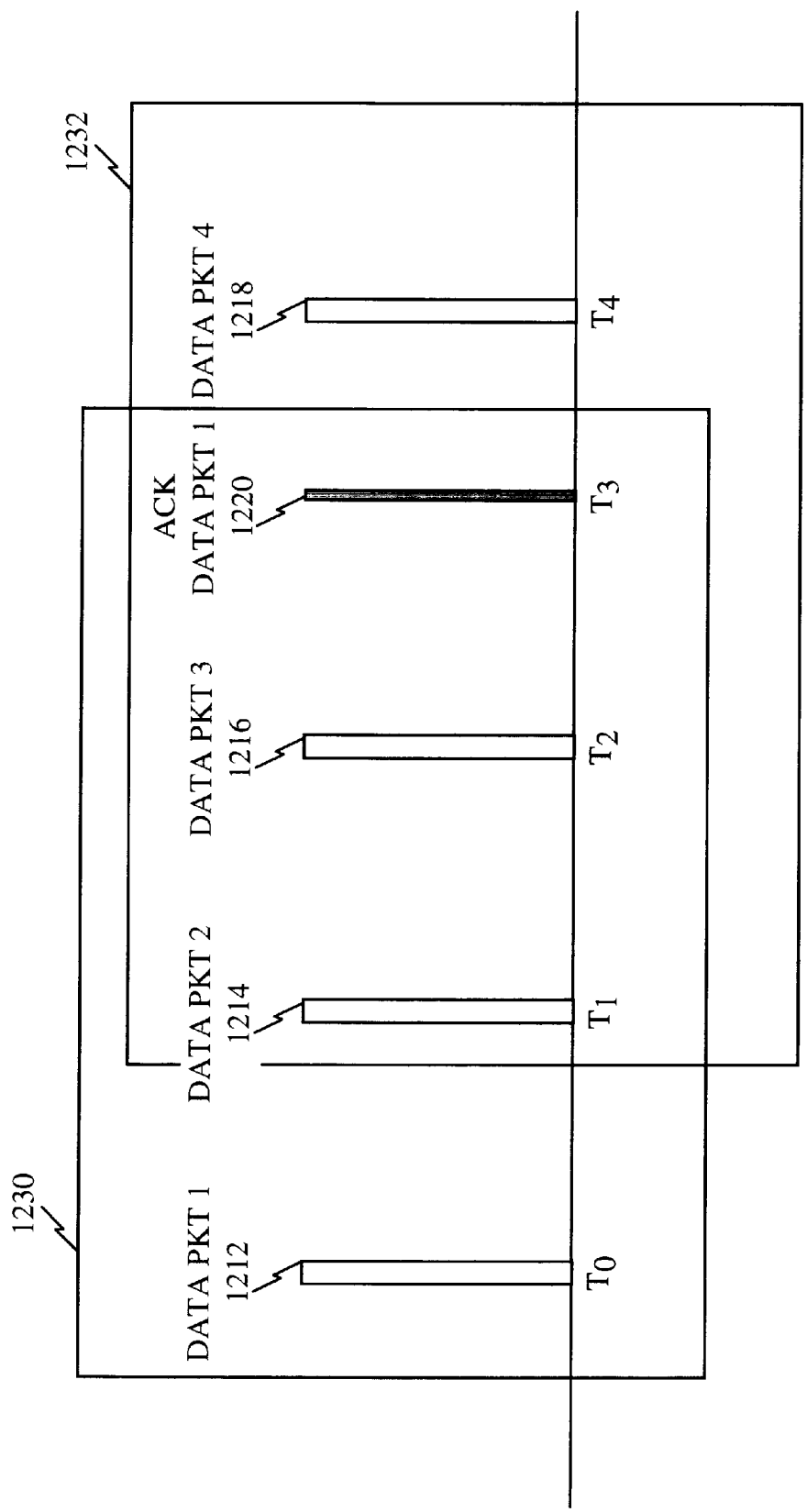
FIG. 12 is a time-line of data packets transmitted from a host computer.

For example, referring to the time-line of FIG. 12, using a sliding window 1230, host computer 118 can have, for example, up to three data packets outstanding at a time. Thus, host computer 118 can send data packet 1212 at time T0, followed by data packet 1214 at time T1 and data packet 1216 at time T2. Host computer 118 then waits for acknowledges 1220 from remote terminal 110. When host computer receives an acknowledge for any of data packets 1212–1216, window 1230 slides to permit another data packet to be sent by host computer 118. For example, when an acknowledge 1220 is received at time T3 for data packet 1212, sliding window 1230 becomes sliding window 1232 and host computer 118 can send a fourth data packet 1218 at time T4.

Host computer 118 sets a round trip timer (RTT) (not shown) for each data packet that it sends. The RTT is an estimated round trip time that it takes for a data packet 120 to be received by remote terminal 110 and for a corresponding acknowledge 122 to be received by host computer 118. If the RTT for a data packet 120 expires before receipt of acknowledge 122, host computer 118 presumes that the data packet 120 was lost prior to receipt by remote terminal 110. Host computer 118 then retransmits the data packet to remote terminal 110.

Host computer 118 should calculate the RTT based on the sum of individual delays of the transmit chain plus any latency due to slow links, such as slow link 116. Host computer 118 can, for example, send a 1 byte packet to remote terminal 110 and measure the time between sending the packet and receiving an acknowledge. In FIG. 2, for example, there can be 80 milli-seconds (msec) of delay in CDMA mobile unit 216, 20 msec of delay between CDMA mobile 216 and base station controller 218, 40 msec delay in base station controller 218 and CDMA IWF 214 and 80 msec delay between host 118 and CDMA IWF 214, for a total one way trip delay of 220 msec or a round trip delay of 440 msec.

Slow link 116 also has a latency or bottle neck throughput which can be, for example, 1200 bits per second (bps), 2400 bps, 4800 bps, 9600 bps, 14,400 bps, etc. When a data packet is relatively small (e.g., 1 byte), the test data packet is affected by the slow link latency, but only by the delay described above. However, larger data packets and data packets that get queued in the slow link behind other data packets will be subjected to slow link latency that can vary with the slow link nominal throughput, the size of the data packet and size of the slow link queue.

In order to properly determine RTT, host computer 118 must estimate the slow link latency as well as the normal delay. Failure to do so will result in under estimating RTT. When RTT is under estimated, RTT will time out before a corresponding acknowledge 122 is received by host computer 118.

Figure 13:
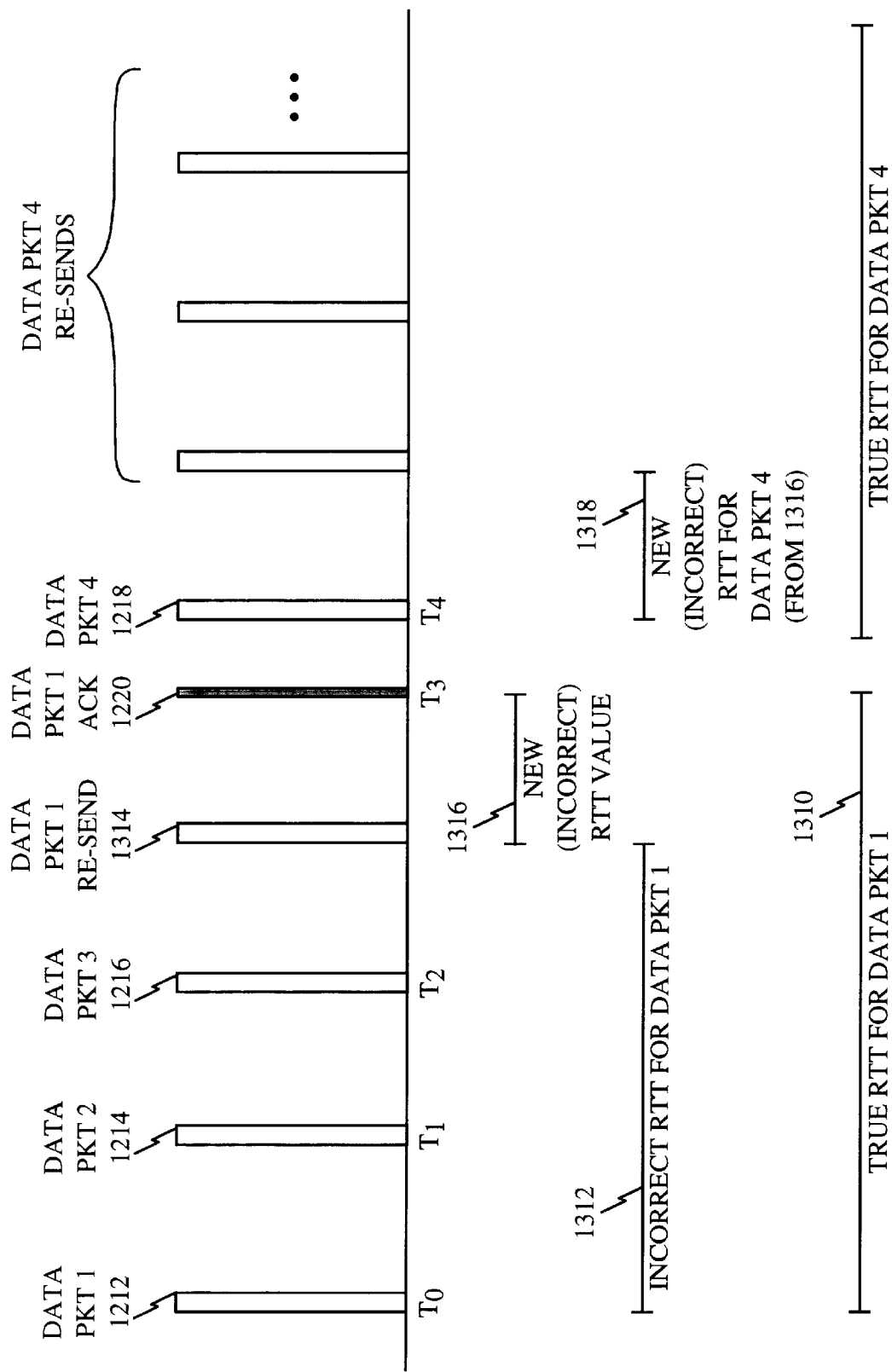
FIG. 13 is a time-line of data packets transmitted from a non-compliant host computer.

For example, referring to the time-line of FIG. 13, RTT 1310 is the actual round trip time for data packet 1212. RTT 1312 is an incorrectly estimated round trip time that omits the latency due to slow link 116. RTT 1310 is not necessarily drawn to scale with RTT 1312. At the end of RTT 1312, host computer 118 retransmits data packet 1212 as data packet 1314 because it did not receive an acknowledge for data packet 1212 before RTT 1312 expired. Unless data packet 1212 was actually lost in transmission, retransmitted data packet 1314 is unnecessary and thus, adds to the bottleneck at slow link 116.

An additional problem caused by a non-compliant host computer 118 is a further shortening of RTT 1312 based on acknowledge 1220. Host computer 118 receives acknowledge 1220 at time T3 as an acknowledgment of receipt of data packet 1212. However, since data packet 1314 is a retransmission of data packet 1212, acknowledge 1220 of data packet 1212 is substantially identical to an acknowledge that would be expected by host computer 118 for data packet 1314. Since host computer 118 reset its RTT for the data packet when it retransmitted it as 1314, host computer 118 concludes that acknowledge 1220 is an acknowledge of retransmitted data packet 1314. Host computer 118 then re-estimates RTT based on the elapsed time 1316 between retransmission 1314 and acknowledge 1220. As a result, when host computer 118 sends data packet 1218 at time T4, RTT is set to new RTT 1318 (eg., a value equivalent to 1316), which is even shorter than the originally miscalculated RTT 1312. Thus, an acknowledge for data packet 1218 will be expected within new RTT 1318. When host computer 118 fails to received an acknowledge within new RTT 1318, it will re-send data packet 1218 until it receives an acknowledge.

In a slightly more complicated scenario, which has been experienced, incorrect RTT 1312 and/or new RTT 1318 are much shorter than actual RTT 1310. As a result, host computer 118 unnecessarily retransmits a given data packet multiple times before receiving an acknowledge for the initial sending of the data. When this scenario is repeated for data packets 1214 and 1216 as well, the bottleneck of slow link 116 can substantially reduce the amount of new data sent from host computer 118 to remote terminal 110.

3. Slow Link TCP Optimizer

Figure 5:
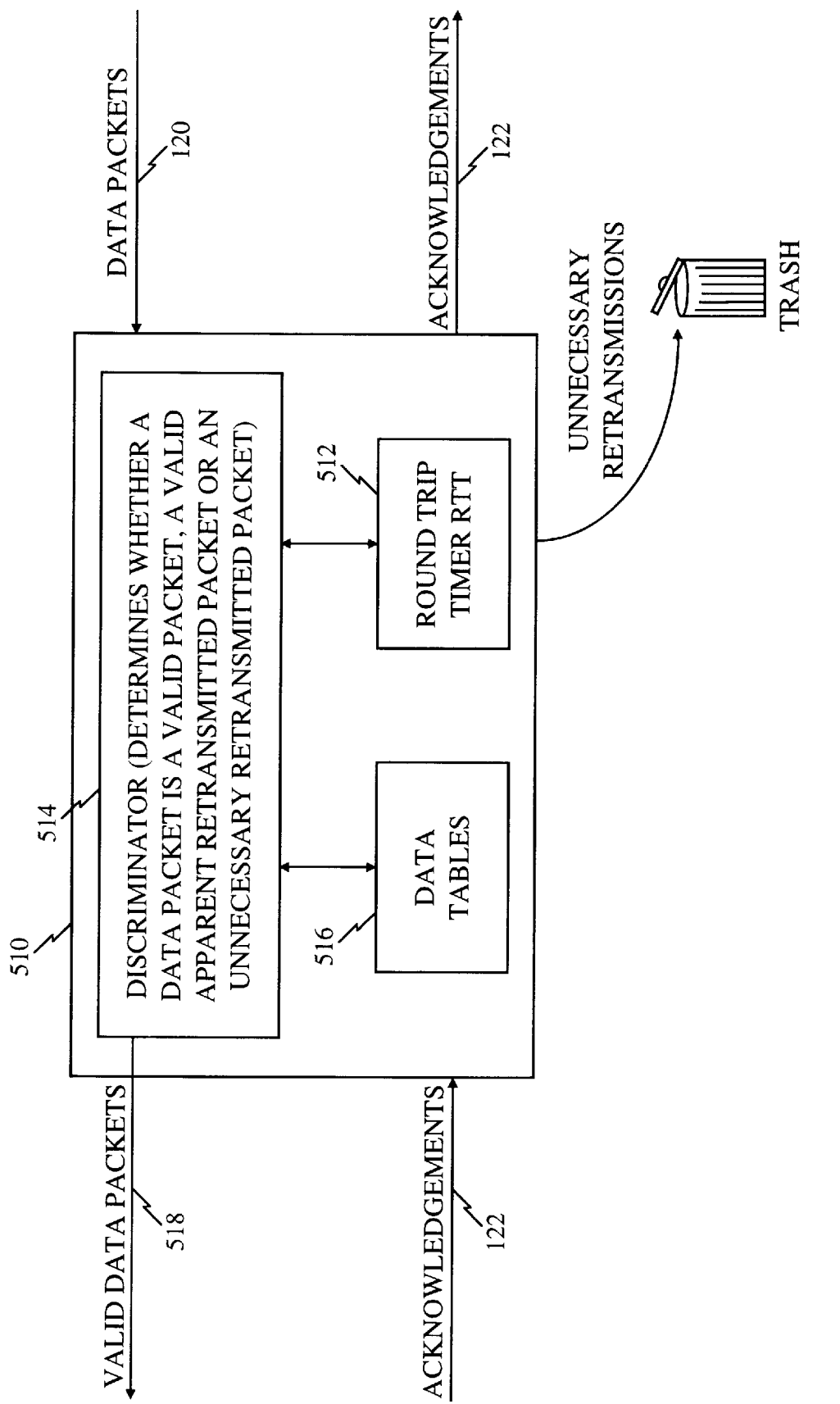
FIG. 5 is a block diagram of a slow link TCP optimizer that eliminates unnecessary retransmissions from a host computer, in accordance with the present invention.

Referring to FIG. 5, a slow link TCP optimizer 510 eliminates unnecessary retransmissions from a host computer based on a round trip timer (RTT) 512, which is completely independent of a round trip timer in host computer. Slow link TCP optimizer 510 can be implemented through software, firmware, hardware or any combination thereof. Slow link TCP optimizer 510 includes a discriminator 514 that receives data packets 120 from internet host computer 118 and data tables 516 that store limited information for use by discriminator 514 to determine whether a packet 120 is a new packet, a valid retransmitted packet or an unnecessary retransmitted packet.

In one embodiment, data tables 516 store a current sequence number (seq_num), an end-of-packet number (end_of_pkt), an expected sequence number (expected_seq_num) and a highest sequence number (highest_seq_num). These values are generated from a TCP sequence number and an IP field length that are included in each data packet.

Referring to FIG. 10, sample values for a current seq_number 1012, an end_of_pkt number 1014, an expected_seq_num 1016 and a highest_seq_num 1018 are illustrated for consecutive data packets 120 that are received by slow link TCP optimizer 510 at times T0 through T5. In this embodiment, discriminator 514 compares the sequence number of a received packet 120 to one or more of data values 1014–1018, to determine whether the received data packet is a new packet, a valid retransmitted packet or an unnecessary retransmitted packet.

Data tables 516 typically store these values only for a current time. The consecutive values in FIG. 10 are provided to illustrate the changing values over time, as described more fully below with reference to the process flowchart of FIG. 9.

Slow link TCP optimizer 510 does not store a queue of data packets 120. Instead, discriminator 514 determines whether a data packet is valid based on round trip timer 512 and data tables 516. This eliminates a need for a buffer queue which could otherwise be employed for determining whether a data packet 120 is a valid packet, a valid retransmitted packet or an unnecessary retransmitted packet.

Slow link TCP optimizer 510 passes valid packets and valid retransmitted packets to slow link 116, as data packets 518, for transmission and to remote terminal 110. Slow link TCP optimizer 510 discards unnecessary retransmitted data packets. Unnecessary transmissions thus do not contribute to bottleneck at slow link 116. Additional details of slow link TCP optimizer 510 are provided below with reference to the process flowcharts of FIGS. 8 and 9.

Figure 6:
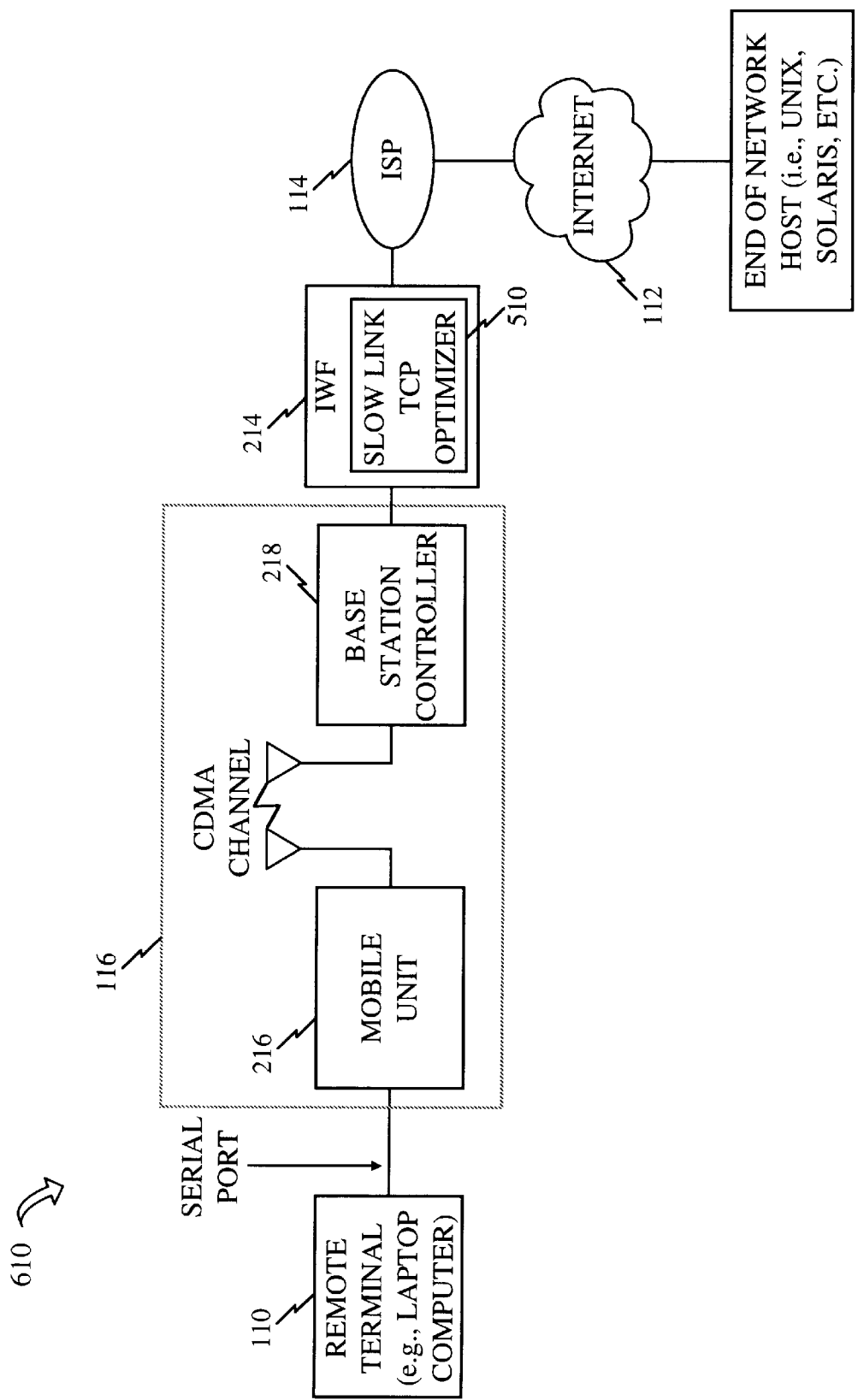
FIG. 6 is a block diagram of the slow link TCP optimizer of FIG. 5, implemented in a CDMA system.

Referring to FIG. 6, slow link TCP optimizer 510 can be implemented in a CDMA system 610, which can be the CDMA system illustrated in FIG. 2. In FIG. 6, slow link TCP optimizer 510 is illustrated as implemented within IWF 214. Alternatively, slow link TCP optimizer 510 could be implemented between IWF 214 and base station controller 218, between IWF 214 and ISP 114, between ISP 114 and internet 112 or within ISP 114.

Figure 7:
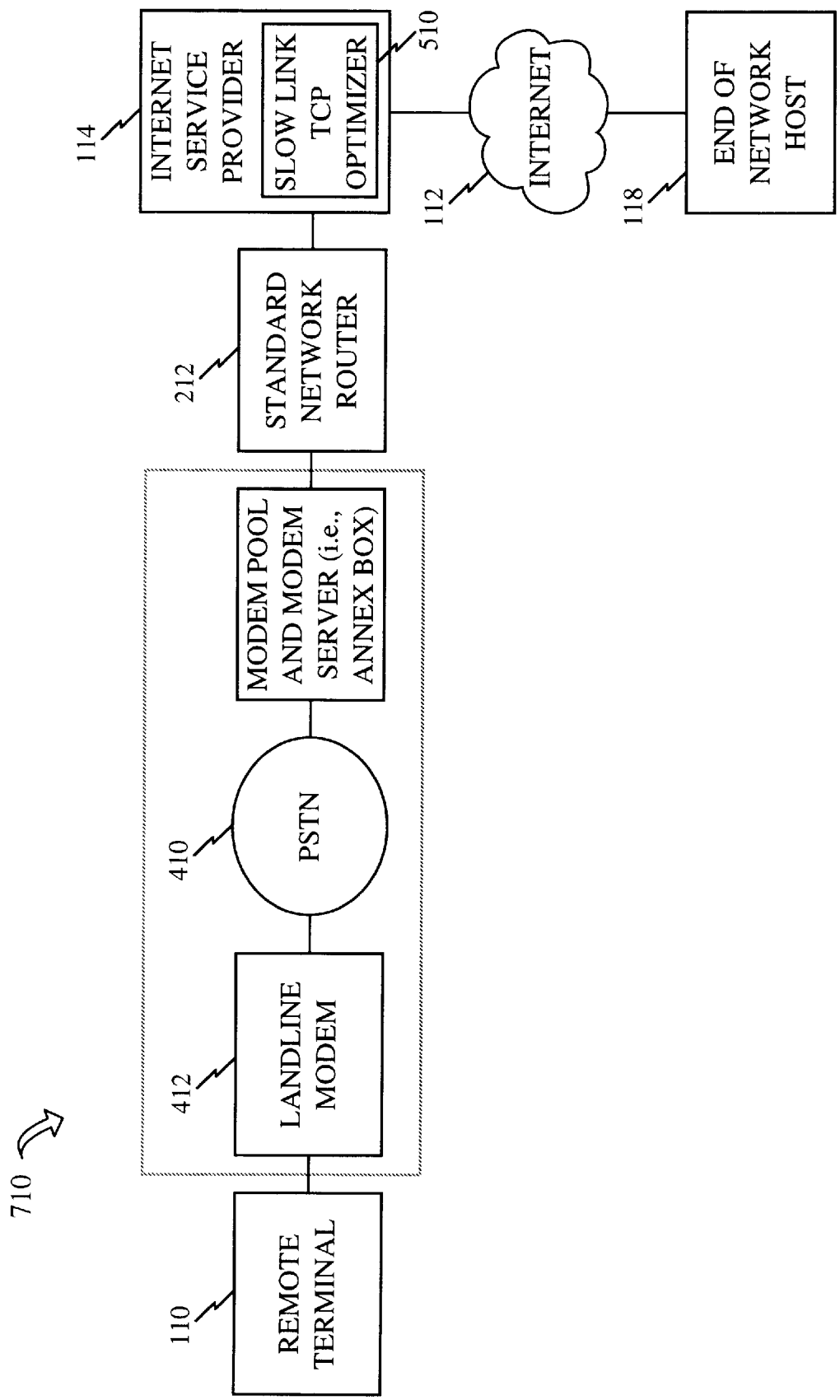
FIG. 7 is a block diagram of the slow link TCP optimizer of FIG. 5, implemented in a land line modem/PSTN system.

Referring to FIG. 7, slow link TCP optimizer 510 can be implemented in a land line modem/PSTN system 710 such as that illustrated in FIG. 4. In FIG. 7, slow link TCP optimizer 510 is illustrated as implemented within ISP 114. Alternatively, slow link TCP optimizer 510 could be implemented as a stand-alone system between PSTN 410 and ISP 114, between ISP 114 and internet 112 or within PSTN 410.

Figure 8:
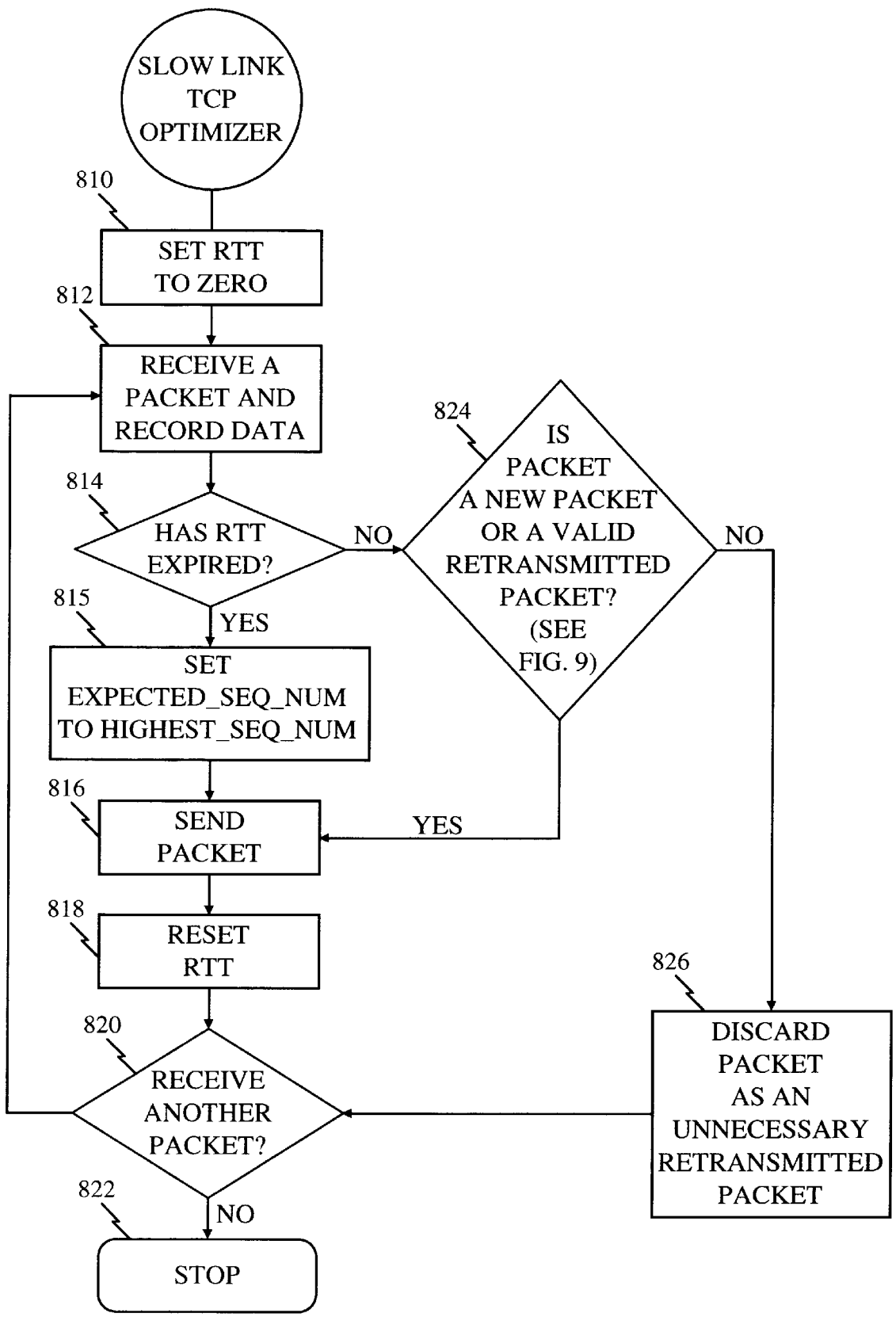
FIG. 8 is a high-level process flowchart illustrating a method for eliminating unnecessary retransmissions from a host computer, in accordance with the present invention.

Referring to FIG. 8, a process flowchart is illustrated for eliminating unnecessary retransmissions from a host computer. The process flowchart of FIG. 8 is described as implemented by TCP optimizer 510. As will be apparent to one skilled in the art, the process flowchart of FIG. 8 could be implemented by a variety of systems and computer program products. The use of slow link TCP optimizer 510 for the description of the process flowchart of FIG. 8 is intended as an example to illustrate the present invention, not to limit it.

Figure 9:
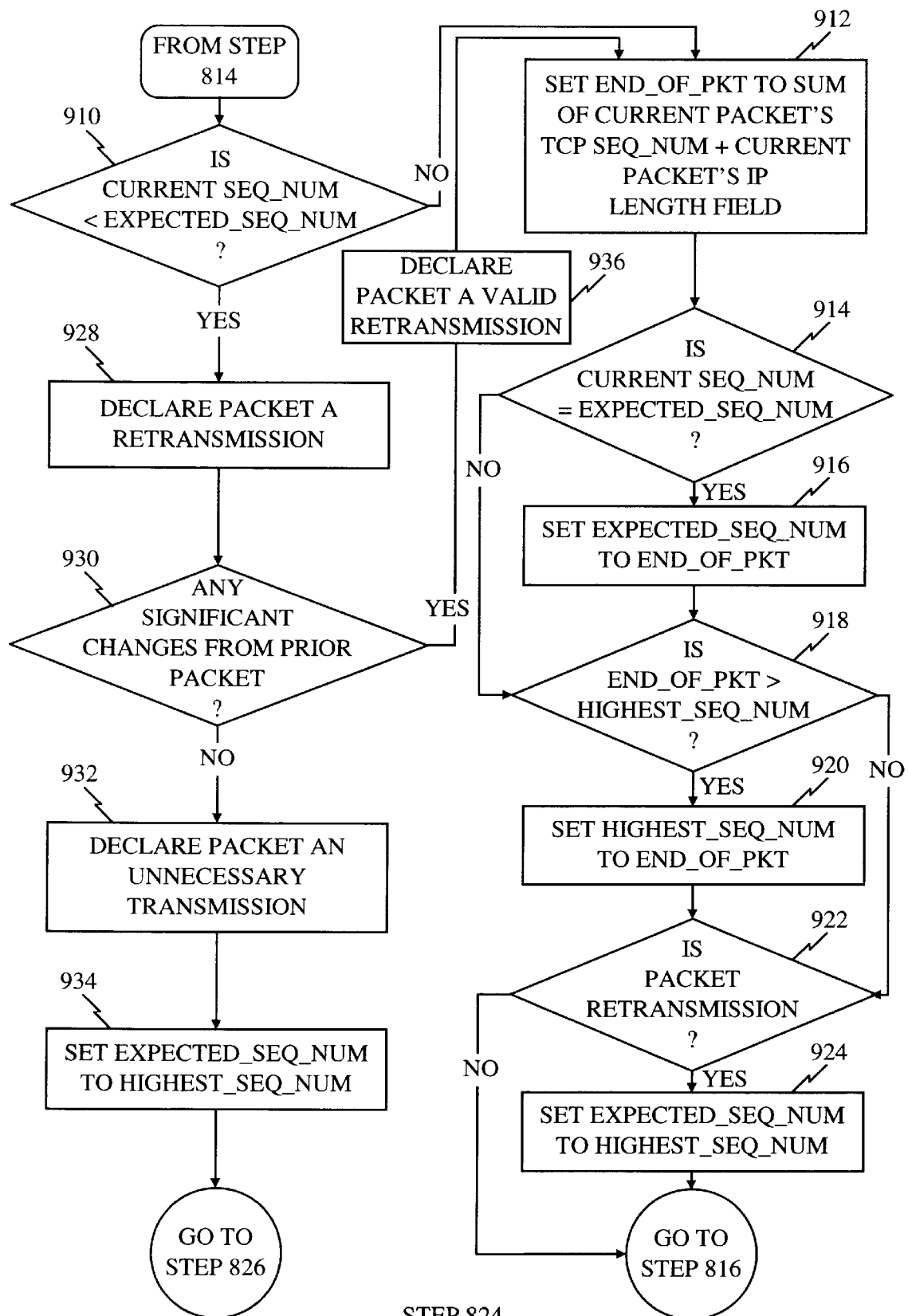
FIG. 9 is a detailed process flowchart illustrating a method for eliminating unnecessary retransmissions from a host computer, in accordance with the present invention.

The steps illustrated in FIGS. 8 and 9 do not necessarily occur in the same order as illustrated in pseudo code 1410. The exact order with which the steps are performed can be rearranged, as will be recognized by one skilled in the art, so long as a determination as to whether to forward a data packet 120 to remote terminal 110 is based on round trip timer 512.

In FIG. 8, the process begins at step 810, where round trip timer 512 is initialized to zero, for example. A separate RTT timer 512 is initialized for every session and for each remote terminal 110. For example, when a CDMA mobile unit 216 initiates a session with base station controller 218, a round trip timer 512 is set for that session.

In step 812, discriminator 514 receives a data packet 120 from host computer 118 and records data in data tables 516. The data packet can be, for example, one of data packets 1212, 1214, 1216, 1218 or 1314. The recorded data preferably includes data packet sequence number and header information. This data is used in step 824, as described more fully below.

In step 814, discriminator 514 determines whether RTT 512 has expired. If RTT 512 has expired, processing proceeds to step 815, where expected_seq_num 1016 is set to highest_seq_num.

In step 816, the data packet is sent as a valid data packet 518 to remote terminal 110. Thus, if RTT 512 has expired, the data packet is automatically treated as a valid data packet, regardless of whether it is a first transmission of the data packet or a retransmission of a prior data packet. More specifically, since RTT 512 has expired, it is concluded that all data packets that were previously sent to slow link 116 have either been received and acknowledged by remote terminal 110 or lost in transmission. Since compliant host computers 118, by definition, do not unnecessarily retransmit data packets before RTT 512 expires, the present invention has no effect on data packets that are sent from compliant host computers.

In step 818, RTT 512 is reset to an estimated round trip time that it takes a data packet 518 to travel from slow link TCP optimizer 510 to remote terminal 110 and for an acknowledge 122 to travel from remote terminal 110 back to slow link TCP optimizer 510. Round trip timer 512 can be set according to RFC 1122 or any other suitable algorithm, so long as it sums nominal transmission delay with any slow link latency.

In step 820, if another data packet is received, control passes back to step 812 for receipt of the data packet. Otherwise, processing stops at step 822.

Referring back to step 814, if RTT 512 has not expired, processing proceeds to step 824 where discriminator 514 determines whether the received packet is a new packet or a valid retransmitted packet. Discriminator 514 can, for example, compare a sequence number of the received packet to data in data tables 516.

Referring to the process flowchart of FIG. 9 and data table 1010 (see FIG. 10), a preferred method for implementing step 824 is provided. Processing begins at step 910, where discriminator 514 compares the sequence number of the received data packet, i.e., seq_num 1012, to expected_seq_num 1016. Preferably, if the received data packet is the first data packet in a sequence, slow link TCP optimizer 510 initializes end-of-packet value 1014, expected sequence number value 1016 and highest sequence number 1018, as illustrated at time T0.

For example, in FIG. 10, a data packet having a sequence number 1 is received and recorded at time T1 in step 812. In step 910 discriminator 514 determines whether seq_num 1012 is less than expected sequence number 1016. Since seq_num 1012 for T1 is not less than expected_seq_num 1016 for T1, processing proceeds to step 912, where end_of_pkt 1014 is set to the sum of the current packet TCP seq_num 1012 plus the current packet's IP field length. In other words, end-of-packet value 1014 is set to the end of the present sequence number which is, essentially, the beginning of the next logical sequence number. Thus, at time T1, end_of_pkt 1014 is set to 2.

In step 914, discriminator 514 determines whether current seq_num 1012 is equal to expected_seq_num 1016. Where, as at time T1, current seq_num 1012 T1 is equal to expected_seq_num 1016, processing proceeds to step 916 where expected_seq_num 1016 is set to end_of_pkt 1014. Thus, at time T1, expected_seq_num 1016 is shown changing from 1 to 2.

In step 918, discriminator 514 determines whether end_of_pkt 1014 is greater than highest_seq_num 1018. Where, as at time T1, end_of_pkt 1014 is greater than highest_seq_num 1018, processing proceeds to step 920 where highest_seq_num 1018 is set to end_of_pkt 1014.

In step 922, discriminator 514 determines whether the received packet was declared a valid retransmission. Declaration of a packet as a valid retransmission is discussed more fully below in step 936. Where, as at time T1, the received data packet is a new transmission, processing proceeds to step 816 for sending of the packet.

When discriminator 514 receives another packet in step 812, and if RTT 512 has not expired, processing returns to step 910 where discriminator 514 determines whether the sequence number of the newly received packet is less than the expected sequence number 1016.

For example, referring to time T2 in FIG. 10, if the sequence number of the newly received data packet is sequence number 2, processing proceeds just as with time T1. As long as each subsequently received packet is the next expected packet, data table 1010 is updated as at time T1 and discriminator 514 passes data packets 120 to remote terminal 110 as data packets 518. Thus, so long as host computer 118 properly sets its internal round trip timer, it does not send any unnecessary retransmissions and discriminator 514 does nothing more than update data tables 516 and pass data packets 120 to remote terminal 110 as data packets 518.

However, if internet host 118 retransmits a data packet, discriminator 514 employs round trip timer 512 and data tables 516 to determine whether the retransmission is a valid retransmission or an unnecessary retransmission. For example, referring to time T3 in FIG. 10, the next expected data packet has a sequence number of 3. Accordingly, end_of_pkt 1014, expected_seq_num 1016 and highest seq_num 1018 are updated as at time T1. Thus, at the end of time T3, end-of-packet value 1014, expected sequence number 1016 and highest sequence number 1018 are all set to 4 to indicate that the next expected sequence number is 4.

However, at time T4, the next packet received in step 812 is sequence number 2. Thus, in step 910, discriminator 514 determines that seq_num 1012 is less than expected_seq_num 1016 and processing proceeds to step 928 where discriminator 514 declares the packet a retransmission. This does not automatically preclude the data packet from being sent to remote terminal 110. Instead, processing proceeds to step 930 where discriminator 514 determines whether there are any significant changes between the current packet and the prior packet. Discriminator 514 can compare, for example, header information of the current packet and header information of the prior data packet or prior data packets.

If there are no significant changes, processing proceeds to step 932, where discriminator 514 declares that the packet is an unnecessary retransmission. In step 934, expected_seq_num 1016 is set to highest_seq_num 1018. The significance of step 934 is discussed below. In step 826, the data packet is discarded as an unnecessary retransmitted packet and processing proceeds to step 820 for receipt of additional packets.

The present invention is designed to accommodate, and recover from, unnecessary retransmissions, such as the unnecessary retransmission of data packet seq_num 2, discussed above. Referring to FIG. 10, at time T5, a data packet having a sequence number of 4 is received in step 812.

In step 910, discriminator 514 determines that seq_num 1012 is not less than expected seq_num 1016. In step 912, discriminator 514 sets end_of_pkt value 1014 to the sum of the current packet's TCP seq_num plus the current packet's IP length field, in this case 5.

In step 914, discriminator 514 determines whether seq_num 1012 is equal to expected_seq_num 1016. Since seq_num 1012 is equal to expected_seq_num 1016, processing proceeds to step 916 where discriminator 514 sets expected_seq_num 1016 to end_of_pkt 1014.

In step 918, discriminator 514 determines whether end_of_pkt 1014 is greater than highest_seq_num 1018. Since end_of_pkt 1014 is greater than highest_seq_num 1018, processing proceeds to step 920 where discriminator 514 sets highest_seq_num 1018 to end_of_pkt 1014. In step 922, discriminator 514 determines that the received data packet is not a retransmission and processing proceeds to step 816 for sending of the packet.

Figure 11:
FIG. 11 is a data table that can be employed by the slow link optimizer illustrated in FIG. 5.

The present invention also accommodates out-of-order receipt of data packets. Referring to FIG. 11, an example of processing of out-of-order data packets is illustrated.

In step 812, a data packet having a sequence number 1 is received at time T1 and recorded in seq_num 1112. Accordingly, end_of_pkt 1114, expected_seq_num 1116 and highest_seq_num 1018 are updated in steps 910–924, as at time T1 in FIG. 10.

At time T2, a data packet having a sequence number of 3 is received in step 812 and recorded in seq_num 1112. In step 910, discriminator 514 determines that the seq_num 1112 is not less than expected_seq_num 1116 and processing proceeds to step 912. In step 912, discriminator 514 sets end_of_pkt 1114 to the sum of the current data packet's TCP sequence number plus the current data packet's IP field length.

In step 914, discriminator 514 determines that seq_num 1112 is not equal to expected_seq_num 1116. Processing jumps to step 918 where discriminator 514 determines that end_of_pkt 1114 is greater than highest_seq_num 1118. In step 920, discriminator 514 sets highest_seq_num 1118 to end_of_pkt 1114. In step 922, discriminator 514 determines that the packet is not a retransmission and processing proceeds to step 816 where the data packet is sent to remote terminal 110.

At time T3, a data packet having a sequence number of 2 is received in step 812 and recorded in seq_num 1112. In step 910, because current seq_num 1112 is two and expected_seq_num 1116 is two, discriminator 514 determines that seq_num 1112 is not less than expected_seq_num 1116. Processing proceeds to step 912 where end_of_pkt 1114 is set to the sum of the current packet's TCP seq_num and the current packet's IP length field (i.e., three).

In step 914, discriminator 514 determines that current seq_num 1112 is equal to expected_seq_num 1116 and, in step 916, sets expected_seq_num 1116 to end_of_pkt number 1114. In step 918, discriminator 514 determines that end_of_pkt 1114 is not greater than highest seq_num 118. Processing jumps to step 922, where discriminator 514 determines that the packet is not a retransmission. Processing then jumps to step 816 where the packet is sent to remote terminal 110.

At time T4, and in step 812, a data packet having a sequence number of four is received and recorded in seq_num 1112. Provided that RTT 512 has not expired, processing proceeds to step 910 where discriminator 514 determines that seq_num 1112 is not less than expected seq_num 1116. In step 912, discriminator 514 sets end_of_pkt 1114 to the sum of the current packet's TCP seq_num 1112 plus the current packet's IP field length. Processing proceeds through step 814 and to step 910.

In step 910, discriminator 514 determines that current seq_num 1112 is not greater than expected_seq_num 1116. In step 912, end_of_pkt is set to the sum of the current packet's TCP seq_num 1112 plus the current packet's IP field length.

In step 914, discriminator 514 determines that seq_num 1112 is not equal to expected_seq_num 1116. Processing jumps to step 918, where discriminator 514 determines that end_of_pkt 1114 is greater than highest_seq_num 1118. In step 920, highest_seq_num 1118 is set to end_of_pkt 1114.

In step 922, discriminator 514 determines that the present data packet is not a retransmission. Processing proceeds to step 816, where the packet is sent to remote terminal 110.

In step 812, at time T5, a data packet having a sequence number of five is received and recorded in seq_num 1112. Provided that RTT 512 has not expired, processing proceeds as at time T4.

Note that from time T3, where packet two was received out of order, expected_seq_number remains at three. When RTT 512 eventually expires, as shown at time T6, for example, processing will reach step 816, where expected sequence number 1116 is set to highest_seq_num 1118.

Set forth below is an example of pseudo code that illustrates a method for eliminating unnecessary retransmissions from an internet host computer in accordance with the steps described above with reference to FIGS. 8 and 9.

```
pkt_hdr=pkt.tcp_ip_hdr;
connection=get_connection(pkt_hdr)//This finds last pkt hdr for this connection
last_pkt_hdr=connection.last_pkt_hdr
rtt=connection.timer
seq_num=pkt.tcp.seq
old_seq_num=last_pkt_hdr.tcp.seq
pkt_is_retx=FALSE;
pkt_valid=TRUE;
if(seq_num<expected_seq_num)
{
    pkt_is_retx=TRUE;
    if(timer_not_expired(rtt))&&(no_significant_hdr_changes(pkt_hdr,
last_pkt_hdr))
        pkt_valid=FALSE
}
if(pkt_valid==FALSE)
{
    expected_seq_num=highest_seq_num;
}
else
{
    set_timer(rtt,(EST_LATENCY+THRUPUT_DELAY
    (pkt_hdr.ip.length)));
    end_of_pkt=seq_num=pkt_hdr.ip.length;    //This is total length of the
                                              IP pkt.
                                              //It is not the header-
                                              length of pkt.
    if(expected_seq_num==seq_num)
    {
```

```
        expected_seq_num==end_of_pkt;
    }
    if(end_of_pkt>highest_seq_num)
    {
        highest_seq_num=end_of_pkt;
    }
    if(pkt_is_retx)
    {
        expected_seq_num=highest_seq_num;
    }
    connection.last_pkt_hdr=pkt_hdr;
    transmit_the_pkt_in_ppp_format(pkt);
}
```

Not shown in the pseudo code above is a function that is called when RTT timer 512 expires. The function sets expected_seq_num equal to highest_seq_num and sends any packets that are received after RTT timer 512 expires.

4. Conclusions

Based upon the foregoing description, one skilled in the art will recognize that there are many suitable algorithms that could be employed by slow link TCP optimizer 510 for determining whether a data packet is a new data packet, a valid retransmitted data packet or an unnecessary retransmitted data packet without storing a queue of previously received data packets. One skilled in the art will also recognize that there are many suitable algorithms that could be employed by slow link TCP optimizer 510 for discriminating between unnecessary retransmissions and valid apparent retransmissions (i.e., out-of-sequence data packets).

The description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method for eliminating unnecessary retransmissions of data packets from a first terminal, comprising the steps of:

(1) receiving a data packet from the first terminal at a first location;

(2)(a) estimating at the first location a round trip time for a data packet to travel from the first terminal to a second terminal, and for an acknowledgment of receipt to arrive at the first terminal from the second terminal, wherein the round trip time is based upon a delay in transmission plus throughput latency resulting from a slow link between the first terminal the second terminal;

(2)(b) determining whether the data packet is a valid data packet or an unnecessary retransmitted data packet based upon the estimated round trip time;

(3) forwarding valid data packets to the second terminal; and (4) discarding unnecessary retransmitted data packets.

2. The method according to claim 1, wherein step (2)(a) further comprises:

(i) determining that the data packet is a valid data packet if a round trip timer has expired, wherein the round trip timer is set according to the estimated round trip time.

3. The method according to claim 1, wherein step (2) further comprises:

(a) maintaining a data table including an expected sequence number.

4. The method according to claim 3, wherein step (2) further comprises the step of:

(b) determining that the data packet is a valid data packet when the following conditions are met;
    (i) a round trip timer has not expired, and
    (ii) the data packet has a sequence number that is not less than the expected sequence number.

5. The method according to claim 4, wherein step (2) further comprises the steps of:

(c) maintaining a current sequence number, an end of packet number, a highest sequence number and the expected sequence number in the data table;

(d) setting the end of packet number to a sum of a TCP sequence number of the data packet and an IP length field of the data packet;

(e) setting the expected sequence number to the end of packet number if the sequence number is equal to the expected sequence number; and (f) setting the highest sequence number to the end of packet number if the end of packet number is greater than the highest sequence number.

6. The method according to claim 3, wherein step (2) further comprises the step of:

(b) determining that the data packet is a valid data packet when the following conditions are met;
    (i) the data packet has a sequence number that is less than the expected sequence number, and
    (ii) the data packet includes data that is not substantially similar to data in a previously received data packet.

7. The method according to claim 6, wherein step (2) further comprises the steps of:

(c) maintaining a current sequence number, an end of packet number, a highest sequence number, the expected sequence number and control flags in the data table;

(d) setting the end of packet number to a sum of a TCP sequence number of the data packet and an IP length field of the data packet;

(e) setting the expected sequence number to the end of packet number if the sequence number is equal to the expected sequence number;

(f) setting the highest sequence number to the end of packet number if the end of packet number is greater than the highest sequence number; and (g) setting the expected sequence number to the highest sequence number.

8. The method according to claim 3, wherein step (2) further comprises the step of:

(b) determining that the data packet is an unnecessary retransmitted data packet when;
   (i) the data packet has a sequence number that is less than the expected sequence number,
   (ii) the data packet includes data that is substantially similar to data in a previously received data packet, and
   (iii) the timer is still running.

9. The method according to claim 8, wherein step (2) further comprises the step of:
   (c) maintaining a current sequence number, an end of packet number, a highest sequence number and the expected sequence number in the data table; and
   (d) setting the expected sequence number to the highest sequence number.

10. The method according to claim 1, wherein step (2) comprises the step of:
   (a) determining that a data packet is a valid data packet if the data packet is was not previously received and if the data packet has a sequence number that is less than a sequence number of a previously received data packet.

11. A system for eliminating unnecessary retransmissions of data packets from a first terminal, comprising:
   a round trip timer that estimates a round trip time that it takes for a data packet to travel to a second terminal and for an acknowledgment of receipt to return from the second terminal, based upon delay in transmission plus throughput latency resulting from a slow link;
   data tables that store information associated with the data packets including an expected sequence number; and
   a discriminator that receives the data packets from the first terminal, that employs said round trip timer to determine whether the data packets are valid data packets or unnecessary retransmitted data packets, that forwards valid data packets to a second terminal and that discards unnecessary retransmitted data packets.

12. The system according to claim 11, wherein said discriminator comprises:
   means for determining that the data packet is a valid data packet when said round trip timer has expired.

13. The system according to claim 12, wherein said discriminator comprises:
   means for determining that the data packet is a valid data packet when said round trip timer has not expired and the data packet has a sequence number that is not less than the expected sequence number.

14. The system according to claim 13, wherein said discriminator comprises:
   means for determining that the data packet is a valid data packet when said round trip timer has not expired, the data packet has a sequence number that is less than the expected sequence number, and the data packet includes data that is not substantially similar to data in a previously received data packet.

15. The system according to claim 14, wherein said discriminator further comprises:
   means for maintaining a current sequence number, an end of packet number, a highest sequence number and the expected sequence number in said data table;
   means for setting the end of packet number to a sum of a TCP sequence number of the data packet and an IP length field of the data packet;
   means for setting the expected sequence number to the end of packet number when the sequence number is equal to the expected sequence number;
   means for setting the highest sequence number to the end of packet number when the end of packet number is greater than the highest sequence number; and
   means for setting the expected sequence number to the highest sequence number when the data packet has a sequence number that is less than the expected sequence number and the data packet includes data that is not substantially similar to data in a previously received data packet.

16. The system according to claim 11, wherein said discriminator comprises:
   means for determining that the data packet is an unnecessary retransmitted data packet when the data packet has a sequence number that is less than the expected sequence number and the data packet includes data that is substantially similar to data in a previously received data packet.

17. The method according to claim 16, wherein said discriminator further comprises:
   means for maintaining a current sequence number, an end of packet number, a highest sequence number and the expected sequence number in said data tables; and
   means for setting the expected sequence number to the highest sequence number.

18. A computer program product comprising a computer useable medium having computer program logic stored therein, said computer program logic for enabling a computer to eliminate unnecessary retransmissions from a first terminal, wherein said computer program logic comprises:
   means for enabling the computer to receive a data packet from the first terminal;
   means for enabling the computer to determine whether the data packet is a valid data packet or an unnecessary retransmitted data packet, said determination considering a round trip time based upon delay in transmission plus throughput latency resulting from a slow link;
   means for enabling the computer to forward valid data packets to a second terminal; and
   means for enabling the computer to discard unnecessary retransmitted data packets.

19. The computer program product according to claim 18, wherein said means for enabling the computer to determine whether the data packet is a valid data packet or an unnecessary retransmitted data packet comprises:
   means for enabling the computer to estimate a round trip time that it takes for a data packet to travel to the second terminal and for an acknowledgment of receipt to return from the second terminal, based upon delay in transmission plus throughput latency resulting from a slow link; and
   means for enabling the computer to determine whether the data packet is a valid data packet or an unnecessary retransmitted data packet based upon the estimated round trip time.

* * * * *